US012572358B2

(12) United States Patent
Subramaniam et al.

(10) Patent No.: US 12,572,358 B2
(45) Date of Patent: Mar. 10, 2026

(54) SYSTEM, APPARATUS AND METHODS FOR MINIMUM SERIALIZATION IN RESPONSE TO NON-SERIALIZING REGISTER WRITE INSTRUCTION

(71) Applicant: Intel Corporation, Santa Clara, CA (US)

(72) Inventors: Kameswar Subramaniam, Austin, TX (US); Jason W. Brandt, Austin, TX (US)

(73) Assignee: Intel Corporation, Santa Clara, CA (US)

(*) Notice: Subject to any disclaimer, the term of this patent is extended or adjusted under 35 U.S.C. 154(b) by 886 days.

(21) Appl. No.: 17/358,098

(22) Filed: Jun. 25, 2021

(65) Prior Publication Data

US 2022/0413860 A1 Dec. 29, 2022

(51) Int. Cl.
*G06F 9/30* (2018.01)
*G06F 9/38* (2018.01)
*G06F 9/52* (2006.01)

(52) U.S. Cl.
CPC ...... *G06F 9/30145* (2013.01); *G06F 9/30087* (2013.01); *G06F 9/30101* (2013.01); *G06F 9/3802* (2013.01); *G06F 9/52* (2013.01)

(58) Field of Classification Search
CPC ............. G06F 9/30145; G06F 9/30087; G06F 9/30101; G06F 9/3802; G06F 9/52; G06F 9/30043; G06F 9/3012
See application file for complete search history.

(56) References Cited

U.S. PATENT DOCUMENTS

| | | | | |
|---|---|---|---|---|
| 6,286,095 | B1 * | 9/2001 | Morris | G06F 9/30043 |
| | | | | 712/216 |
| 7,552,302 | B1 * | 6/2009 | Tene | G06F 9/3834 |
| | | | | 711/167 |
| 8,402,279 | B2 | 3/2013 | Henry et al. | |
| 10,977,191 | B2 | 4/2021 | Northup et al. | |
| 2011/0208915 | A1 * | 8/2011 | Bannon | G06F 9/3842 |
| | | | | 711/E12.024 |
| 2012/0079488 | A1 * | 3/2012 | Phillips | G06F 9/3842 |
| | | | | 718/102 |

(Continued)

OTHER PUBLICATIONS

Intel 64 and IA-32 Architectures Software Developer's Manual (excerpted pages). Intel, 2016 [retrieved on Sep. 30, 2021]. Retrieved from the Internet: <URL: https://usermanual.wiki/Pdf/ ASMBible64ia32architecturessoftwaredevelopermanual.962942983. pdf>.*

(Continued)

*Primary Examiner* — Shawn Doman
(74) *Attorney, Agent, or Firm* — Nicholson De Vos Webster & Elliott LLP

(57) ABSTRACT

In one embodiment, a processor includes: a plurality of registers; a front end circuit to fetch and decode a non-serializing register write instruction, the non-serializing register write instruction to cause a value to be stored in a first register of the plurality of registers; and an execution circuit coupled to the front end circuit. The execution circuit, in response to the non-serializing register write instruction, is to determine an amount of serialization for the non-serializing register write instruction and execute the non-serializing register write instruction according to the amount of serialization. Other embodiments are described and claimed.

20 Claims, 13 Drawing Sheets

1000

Start

1010
Fetch and decode non-serializing MSR write instruction

1020
Provide decoded non-serializing MSR write instruction to execution circuit

1030
Determine amount of serialization based at least in part on target MSR and state of processor 1040
Excecute decoded non-serializing MSR write instruction according to determined amount of serialization 1050
Write value of source operand to target MSR specified by destination operand 1060
Retire non-serializing MSR write instruction

(56) References Cited

U.S. PATENT DOCUMENTS

| | | | |
|---|---|---|---|
| 2017/0153896 A1* | 6/2017 | Mathew ................... | G06F 9/30 |
| 2019/0324756 A1* | 10/2019 | Chappell ............... | G06F 9/3858 |
| 2020/0133679 A1* | 4/2020 | Brandt ................ | G06F 9/30101 |
| 2021/0049028 A1 | 2/2021 | Price | |
| 2022/0100391 A1* | 3/2022 | LeBeane ................. | G06F 9/522 |

OTHER PUBLICATIONS

Intel Corporation, U.S. Appl. No. 16/725,041, filed Dec. 23, 2019, Entitled "System, Apparatus and Method for dynamic pipeline stage control of data path dominant circuitry of an integrated circuit," 47 pgs.

* cited by examiner

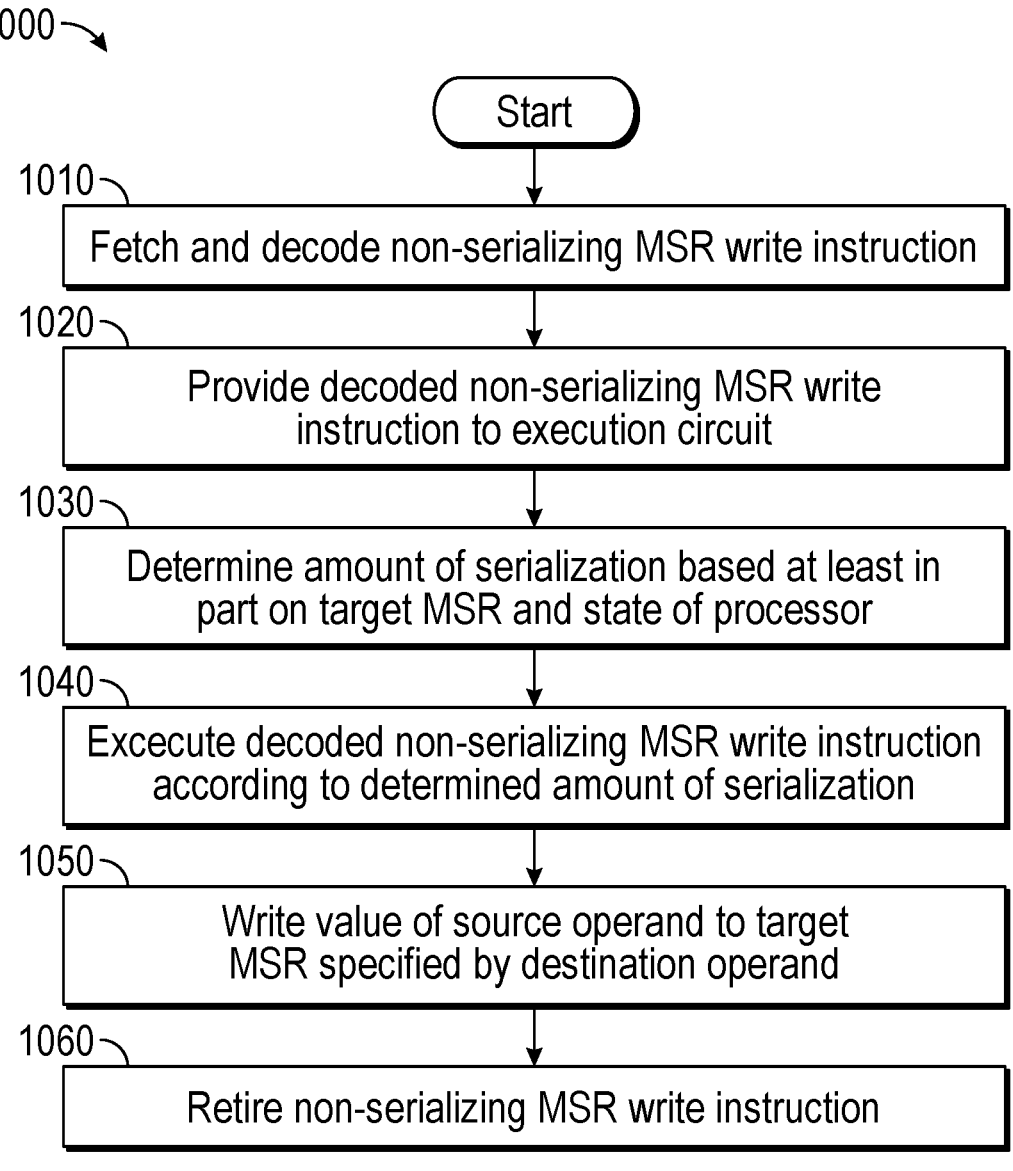

1000

Start

1010 — Fetch and decode non-serializing MSR write instruction

1020 — Provide decoded non-serializing MSR write instruction to execution circuit 1030 — Determine amount of serialization based at least in part on target MSR and state of processor 1040 — Excecute decoded non-serializing MSR write instruction according to determined amount of serialization 1050 — Write value of source operand to target MSR specified by destination operand 1060 — Retire non-serializing MSR write instruction

FIG. 10

SYSTEM, APPARATUS AND METHODS FOR MINIMUM SERIALIZATION IN RESPONSE TO NON-SERIALIZING REGISTER WRITE INSTRUCTION

BACKGROUND

Modern processors define thousands of system registers, typically referred to as Model Specific Registers (MSRs). These registers are read and written by all kinds of software including basic input output software (BIOS), operating system (OS), drivers, and hypervisors. An x86 instruction set architecture (ISA) instruction, Write MSR (WRMSR), is used to write MSRs. This instruction is an architecturally serializing instruction, which causes it to have variable and long latency depending on what older stores are in flight. Common tasks like initializing system registers, application and virtual context switch, and tracing/debug, require writing many MSRs and are hence negatively impacted by the latency of this WRMSR instruction.

Since this instruction is architecturally serializing for all MSRs by default, certain performance sensitive MSRs have been identified as non-serializing, such that on detection of these limited registers as the instruction operand, architecturally serializing semantics are bypassed. However, this specific identification only works for a few specified MSRs out of the several thousand currently defined MSRs, and thus an unnecessary performance penalty exists for the rest. Further, each non-serializing MSR that is defined adds complexity and cost for detecting and skipping the architecturally serializing aspect. In addition, each non-serializing MSR that has this special behavior is enumerated for software, incurring custom enabling and increased logic/documentation costs.

BRIEF DESCRIPTION OF THE DRAWINGS

FIG. 10 is a flow diagram of a method in accordance with an embodiment.

DETAILED DESCRIPTION

Figure 1A:
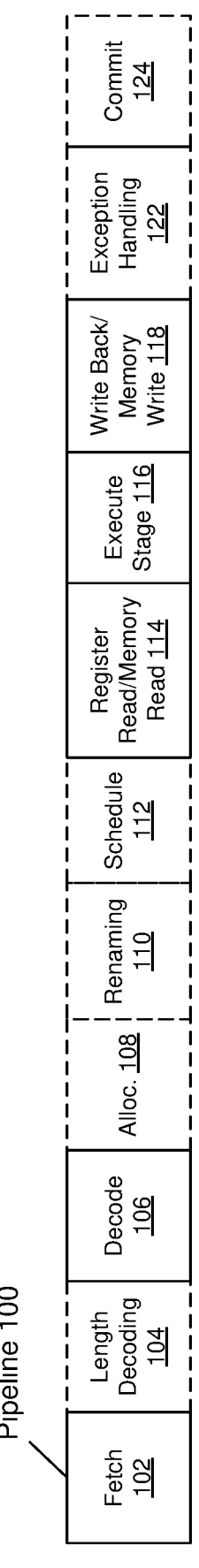
FIG. 1A is a block diagram illustrating both an exemplary in-order pipeline and an exemplary register renaming, out-of-order issue/execution pipeline according to embodiments of the invention.

In various embodiments, a processor is configured to execute an instruction set architecture (ISA) instruction (which may originate from supervisor-level or user-level software) to write a value to hardware state of a processor, such as a given register. More particularly, embodiments provide an instruction to enable lower latency writing of values to registers, and more particularly MSRs, without unnecessarily stalling the processor due to serialization operations that may not be required for a given instance.

For ease of discussion, embodiments are described with a particular named instruction that causes execution of a write operation to a given MSR. However understand that embodiments are not limited in this regard and the instruction described herein, generally referred to as a non-serializing write instruction, may be used to cause write of an arbitrary system register in a performant manner.

In a particular embodiment for use in connection with MSRs, this instruction is referred to as a "non-serializing MSR write" instruction having the instruction mnemonic WRMSRNS. Execution of this instruction allows a processor to have a minimal and functionally correct amount of serialization as warranted for the specific state being updated by the MSR, for the microarchitecture in question. This allows the processor to make this WRMSRNS instruction the fastest possible latency for any MSR in a manner that is mostly transparent to software.

In execution, processor hardware is configured to ensure that all operations before the WRMSRNS instruction do not use the new MSR value, and that all operations after the WRMSRNS instruction use the new value. Legacy software can thus simply be updated by replacing a conventional WRMSR instruction with a WRMSRNS in accordance with an embodiment to improve performance any place where software was not relying on the instruction having a memory ordering side effect.

In this way, reduced latency in executing a non-serialization write MSR instruction can be realized. In contrast, the legacy WRMSR instruction was defined as an x86 architecturally serializing instruction, and incurs high overhead. This is so, as in response to this conventional serializing instruction, a processor performs the following: stops a front end of the processor (namely a fetch circuit); drains all buffered writes to memory; guarantees that all instructions older than the WRMSR instruction have retired before younger instructions can execute; and guarantees that the next instruction is not fetched until all older stores are completed (Globally Observed).

For almost all MSRs, this kind of hard serialization is not required for functional correctness. If state is being written that does not affect the fetching or decoding of the next instruction, software does not actually gain benefit by stopping and restarting front end circuitry. Draining of all older buffered writes to memory can take hundreds of cycles, depending on what stores were recently executed. This delay causes the WRMSR instruction to have unnecessarily long (and variable) latency, although software usage does not typically rely on this draining. Embodiments may thus avoid this latency, and further can avoid special case MSRs that skip serialization based on MSR address.

Figure 1B:
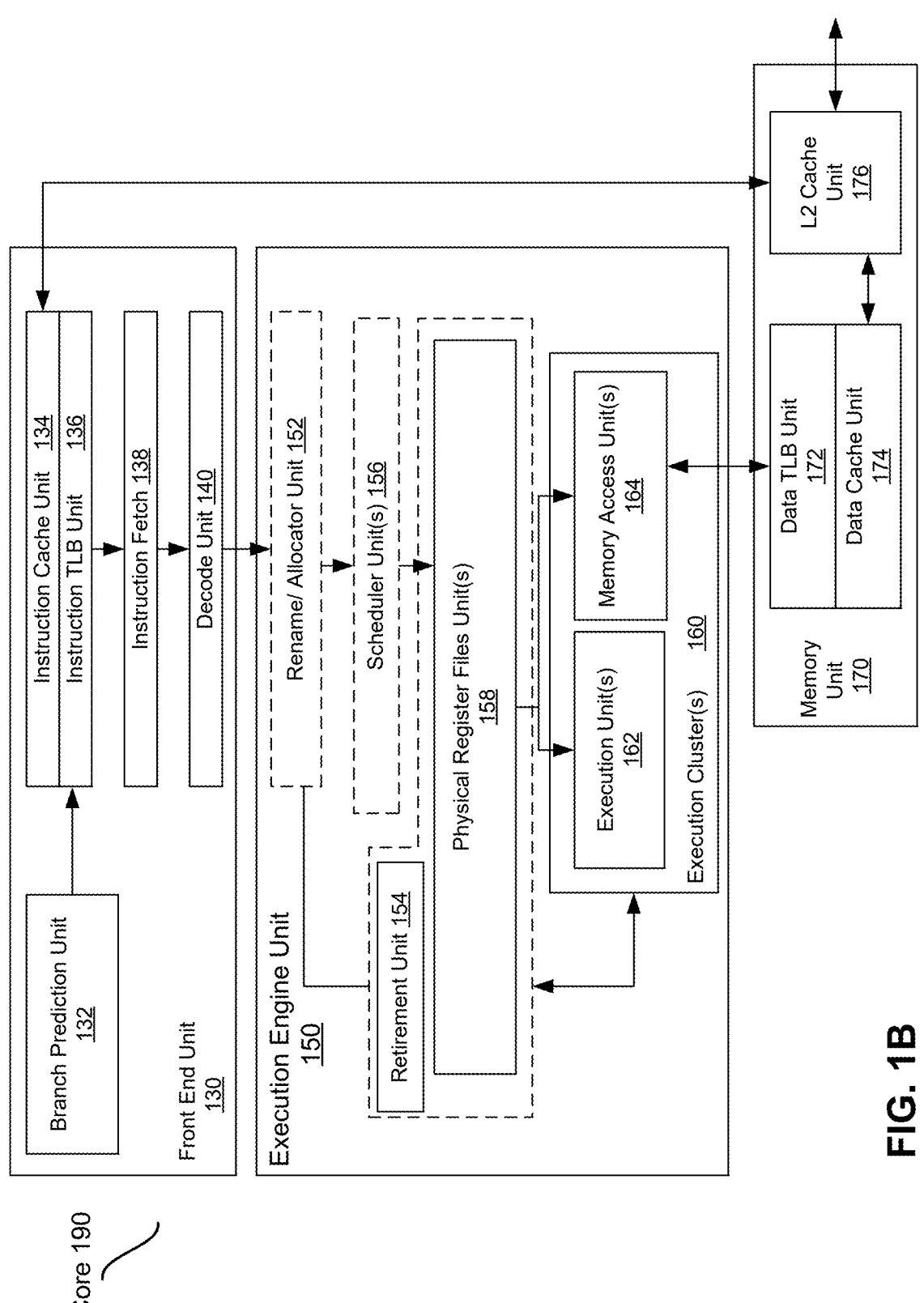
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124. Each of these stages may be configured to handle the non-serializing register write ISA instructions of embodiments described herein.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2B:
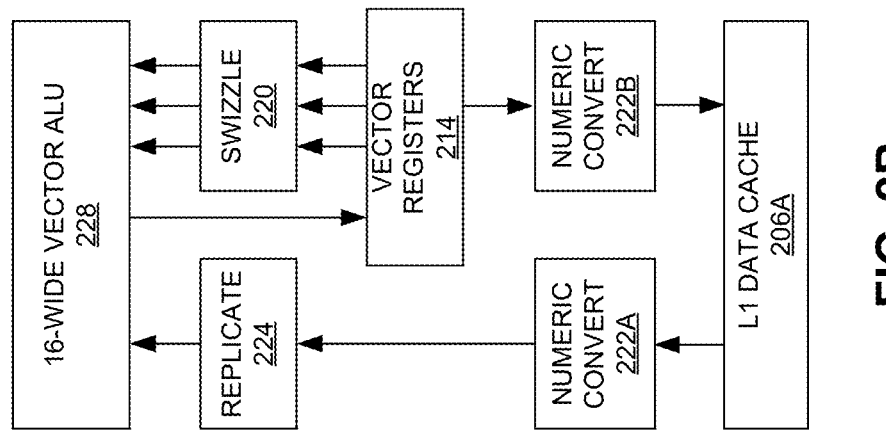
FIGS. 2A-B illustrate a block diagram of a more specific exemplary in-order core architecture in accordance with an embodiment of the present invention.
Figure 2A:
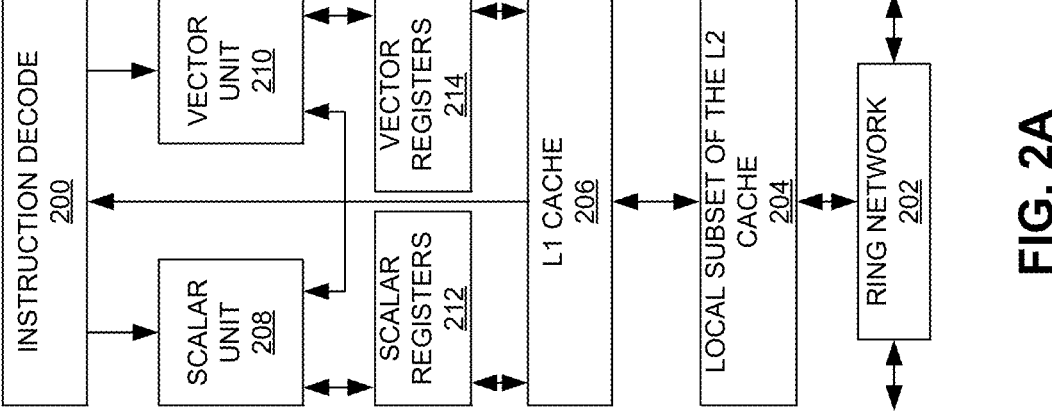

FIGS. 2A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 2B is an expanded view of part of the processor core in FIG. 2A according to embodiments of the invention. FIG. 2B includes an L1 data cache 206A part of the L1 cache 204, as well as more detail regarding the vector unit 210 and the vector registers 214. Specifically, the vector unit 210 is a 6-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input.

Figure 3:
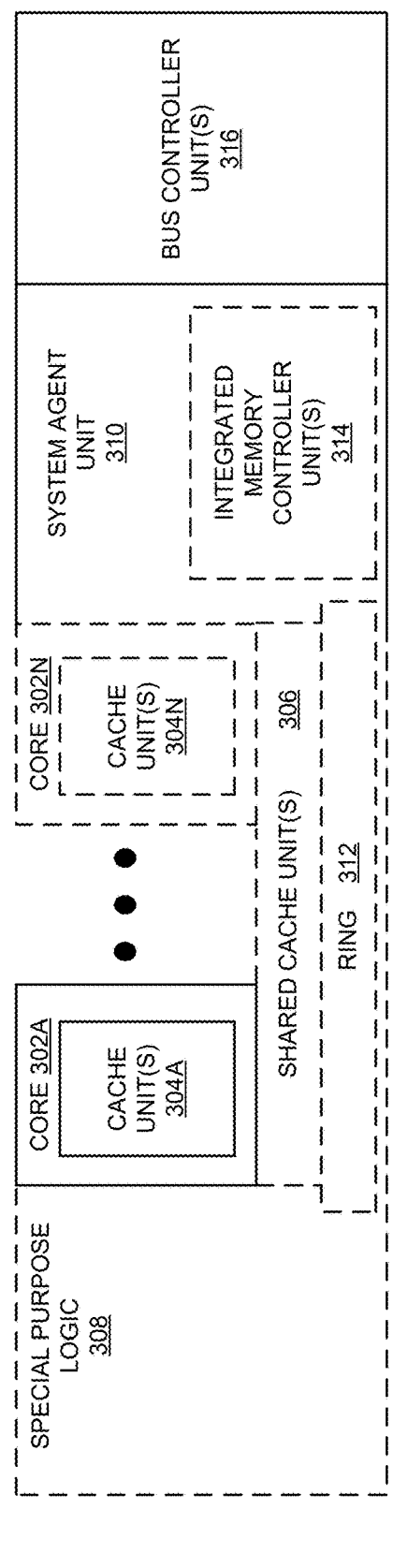
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores 304A-N, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the special purpose logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multi-threading. The system agent 310 includes those components coordinating and operating cores 302A-N. The system agent unit 310 may include for example a power control unit (PCU) and a display unit. The PCU may be or include logic and components needed for regulating the power state of the cores 302A-N and the special purpose logic 308.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
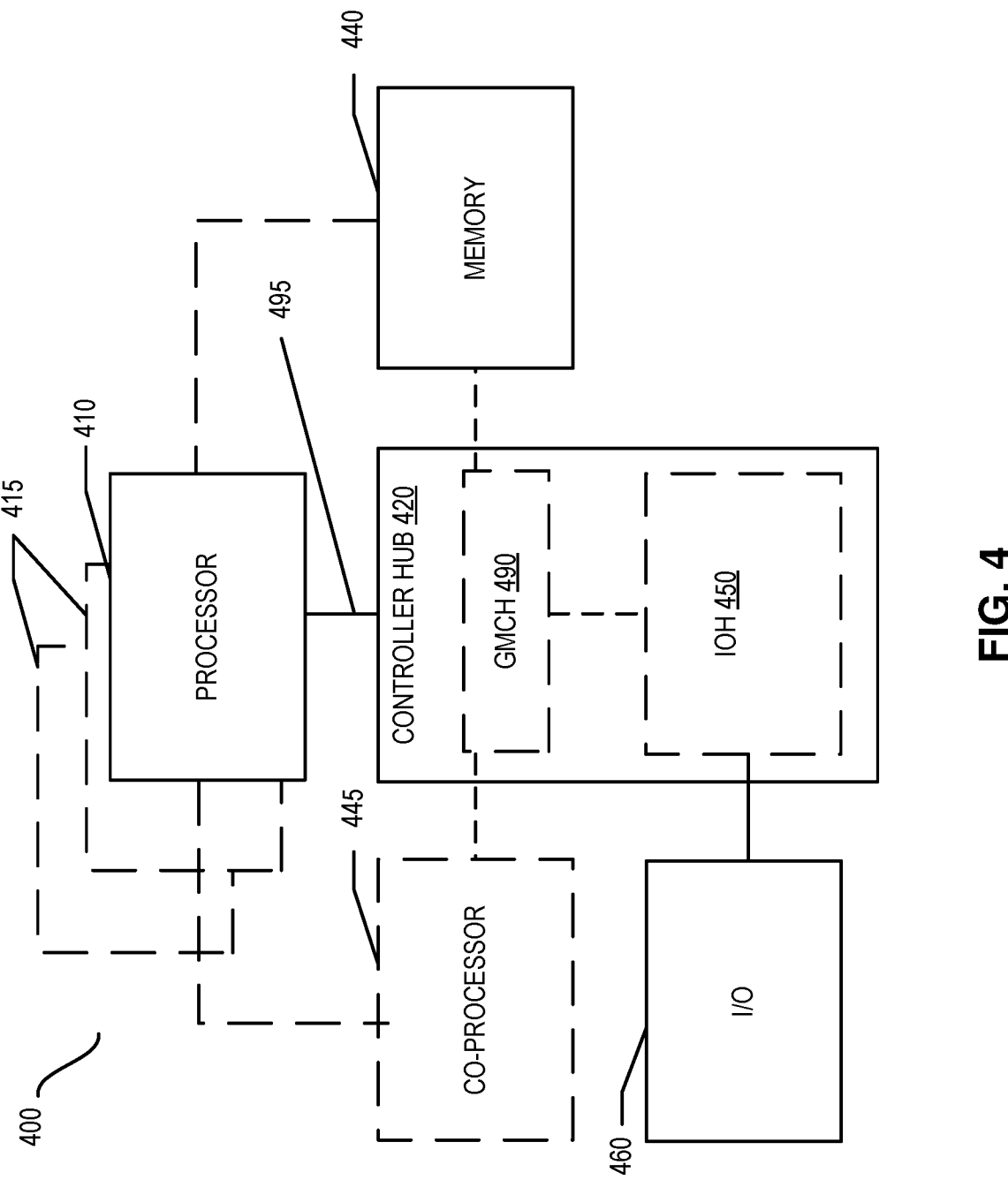
FIG. 4 is a block diagram of a system in accordance with one embodiment of the present invention.

Referring now to FIG. 4, shown is a block diagram of a system 400 in accordance with one embodiment of the present invention. The system 400 may include one or more processors 410, 415, which are coupled to a controller hub 420. In one embodiment, the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multidrop bus, such as a frontside bus (FSB), point-to-point interface, or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
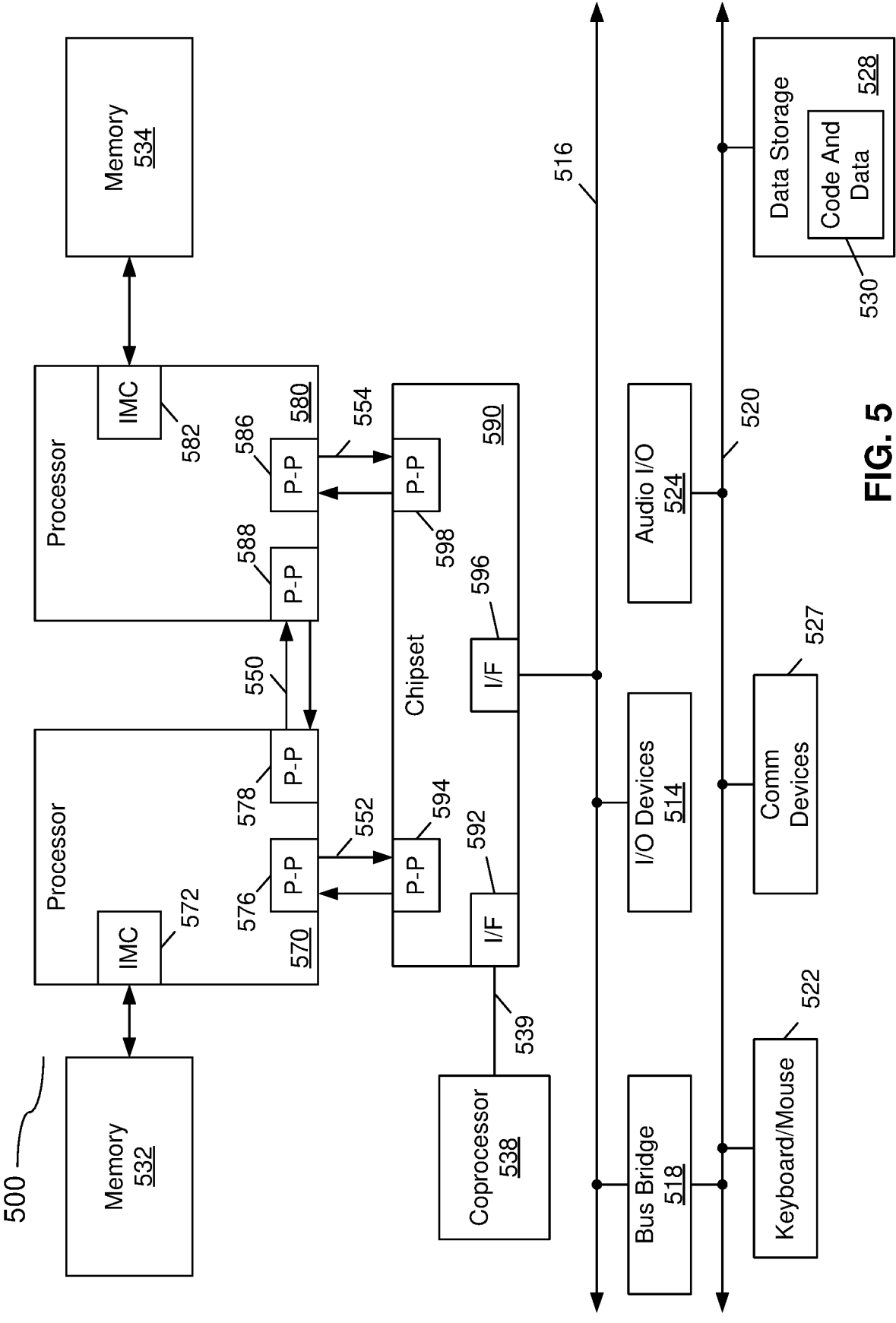
FIG. 5 is a block diagram of a first more specific exemplary system in accordance with an embodiment of the present invention.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 and coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high performance interface 592. In one embodiment, the coprocessor 538 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 516. Note that other architectures are possible. For example, instead of the point-to-point architecture of FIG. 5, a system may implement a multi-drop bus or other such architecture.

Figure 6:
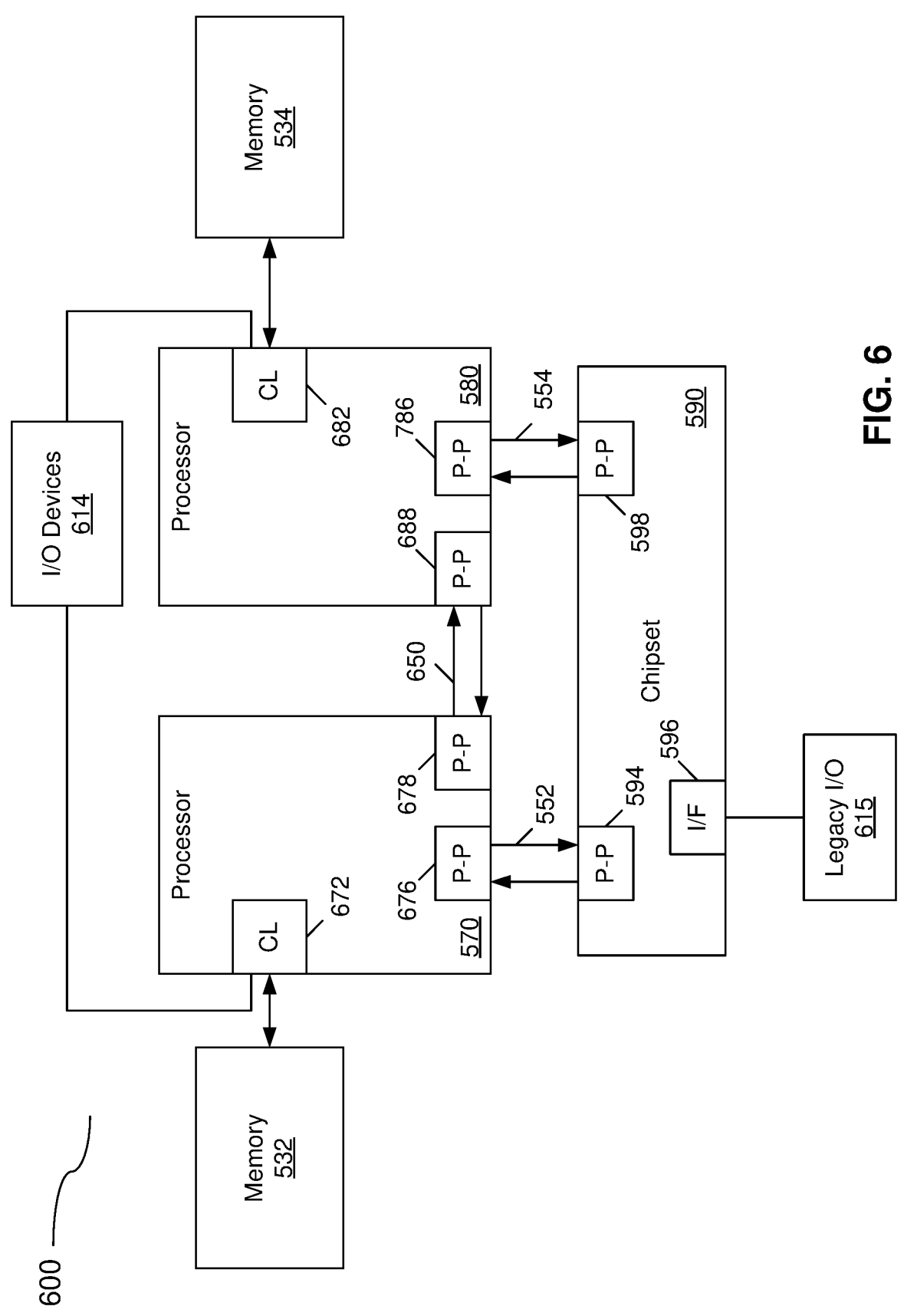
FIG. 6 is a block diagram of a second more specific exemplary system in accordance with an embodiment of the present invention.

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 672, 682 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
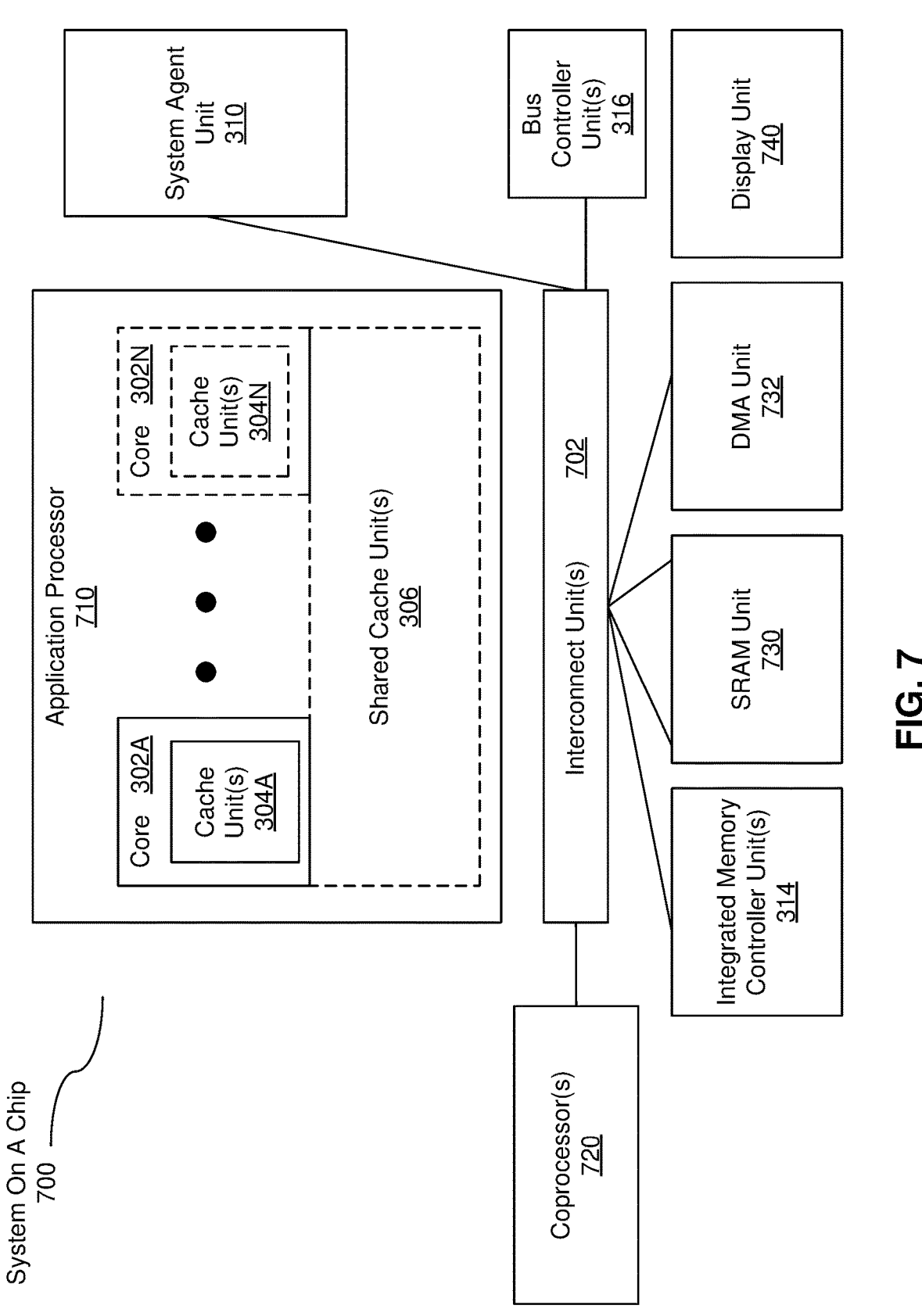
FIG. 7 is a block diagram of a SoC in accordance with an embodiment of the present invention.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, cache units 304A-N, and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; a static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code including non-serializing register write instructions of an ISA executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
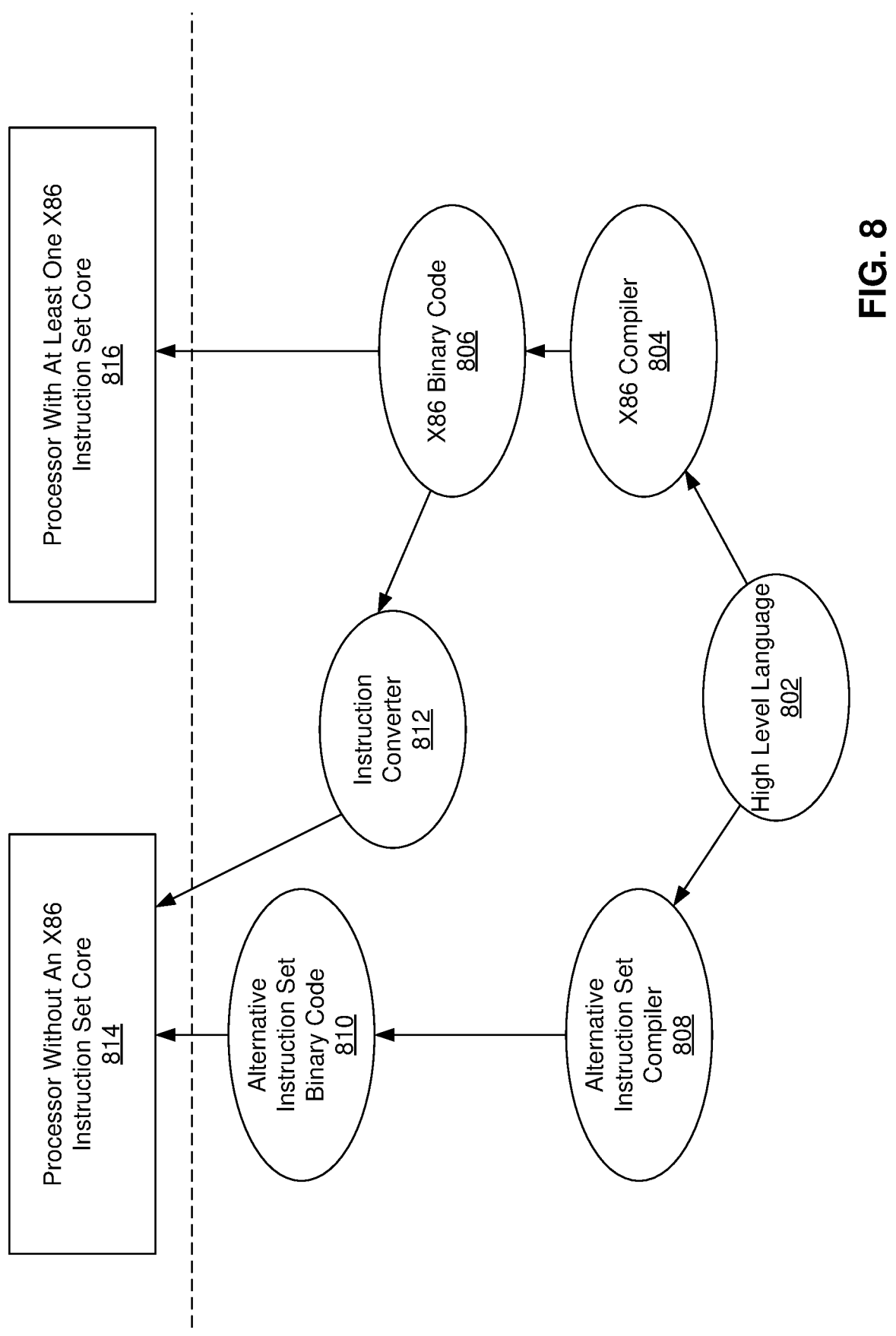
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using a first compiler 804 to generate a first binary code (e.g., x86) 806 that may be natively executed by a processor with at least one first instruction set core 816. In some embodiments, the processor with at least one first instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 804 represents a compiler that is operable to generate binary code of the first instruction set 806 (e.g., object code) that can, with or without additional linkage processing, be executed on the processor with at least one first instruction set core 816. Similarly, FIG. 8 shows the program in the high level language 802 may be compiled using an alternative instruction set compiler 808 to generate alternative instruction set binary code 810 that may be natively executed by a processor without at least one first instruction set core 814 (e.g., a processor with cores that execute the MIPS instruction set of MIPS Technologies of Sunnyvale, CA and/or that execute the ARM instruction set of ARM Holdings of Sunnyvale, CA). The instruction converter 812 is used to convert the first binary code 806 into code that may be natively executed by the processor without an first instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have a first instruction set processor or core to execute the first binary code 806.

Figure 9:
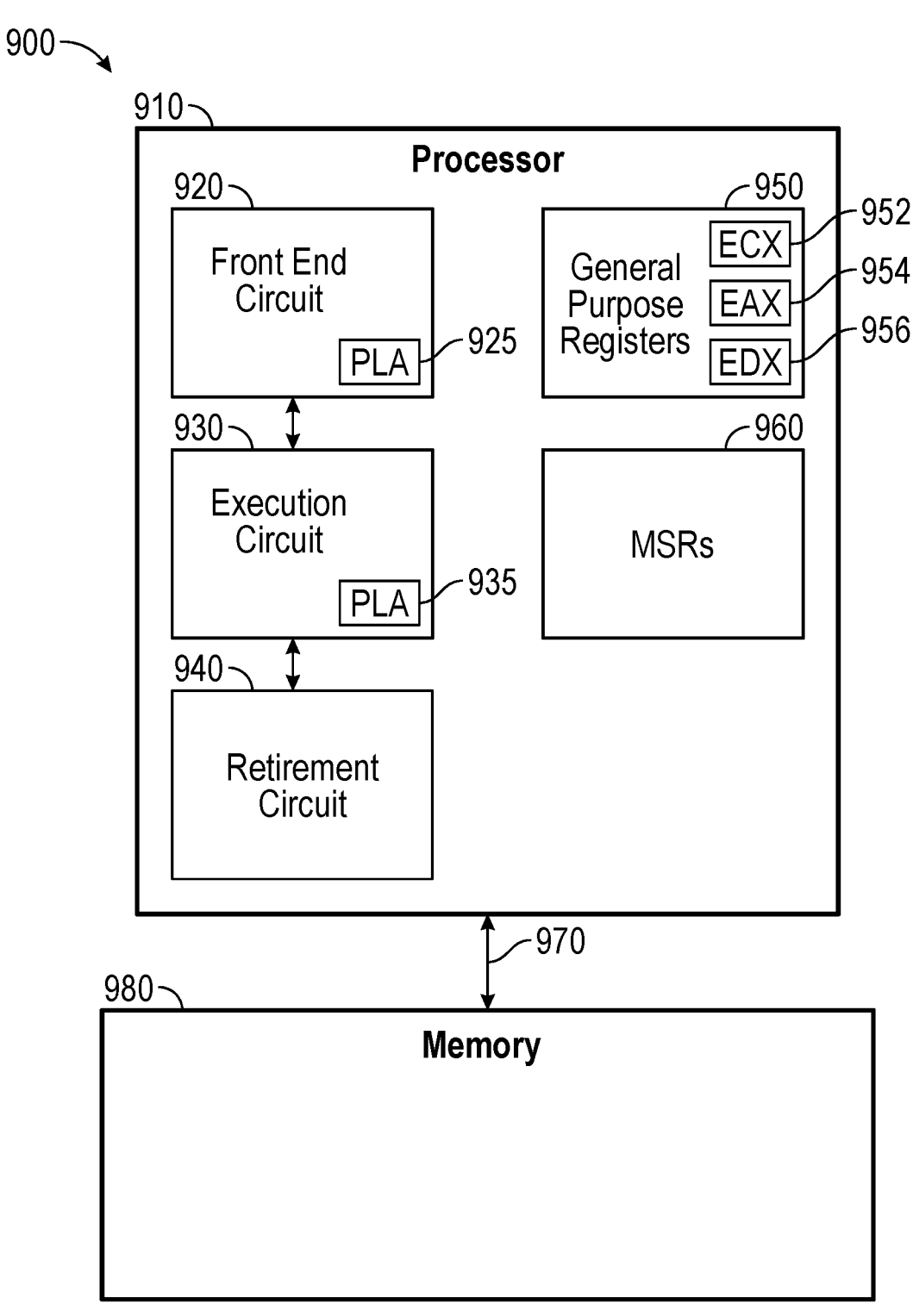
FIG. 9 is a block diagram of a system in accordance with an embodiment.

Referring now to FIG. 9, shown is a high level block diagram of a system in accordance with an embodiment. As shown in FIG. 9, system 900 may be any type of computing platform, ranging from a small portable devices to a larger device. In any case, system 900 includes a processor 910 that is coupled to a memory 980 via a given memory interconnect 970. In different implementations, processor 910 may be a multicore processor or other type of SoC. In the illustration of FIG. 9, certain features of processor 910 are shown that are involved in performing a non-serializing write instruction as described herein.

In FIG. 9, processor 910 includes, at a high level, a front end circuit 920, an execution circuit 930, and a retirement circuit 940. In operation, front end circuit 910 may fetch and decode instructions and provide decoded instructions for execution in execution circuit 930. After execution, instructions may be retired within retirement circuit 940. To perform operations, the various circuits within processor 910 may interact with a set of general-purpose registers 950 and MSRs 960. Of course additional structures are present in a given processor.

To perform a non-serializing write operation in response to the non-serializing write instruction disclosed herein, one or more of front end circuit 920 and execution circuit 930 may include corresponding programmable logic arrays (PLAs) 925, 935. The PLAs, responsive to information associated with such instruction, may take action to determine a minimal amount of serialization to apply, and to enable instruction execution according to this minimal amount of serialization.

Note that representative registers 952, 954 and 956 are shown within general-purpose registers 950. These registers may be used in a representative use case to store implicit operands used by a non-serializing write instruction. For example, register 952 (ECX) may be used to store a target MSR identification, and one or more of registers 954 (EAX) and 956 (EDX) may be used to store a value to be written to this target MSR. Understand of course that other registers may instead be used in different implementations. Understand while shown at this high level in FIG. 9, many variations and alternatives are possible.

In one embodiment, this instruction may have the mnemonic WRMSRNS, and may have the format shown in Table 1:

TABLE 1

| WRMSRNS - Non-Serializing Write to Model Specific Register | | | | | |
|---|---|---|---|---|---|
| Opcode | Instruction | Op/ En | 64-Bit Mode | Compat/ Leg Mode | Description |
| 0F 01 C6 | WRMSRNS | Z0 | Valid | Valid | Write the value in EDX:EAX to MSR specified by ECX. |

In this embodiment, the instruction operand encoding may be as shown in Table 2:

TABLE 2

| Instruction Operand Encoding | | | | |
|---|---|---|---|---|
| Op/En | Operand 1 | Operand 2 | Operand 3 | Operand 4 |
| Z0 | NA | NA | NA | NA |

Understand that while defined with implicit operands, in other cases the instruction may explicitly identify operands.

Referring now to FIG. 10, shown is a flow diagram of a method in accordance with an embodiment. More specifically, method 1000 is a method for executing a non-serializing MSR write instruction in accordance with an embodiment. As such, method 1000 may be executed in a processor having hardware circuitry (alone, and/or in combination with firmware and/or software) to implement a non-serializing write instruction as described herein. As shown, method 1000 begins by fetching and decoding a non-serializing MSR write instruction (block 1010). Such fetching and decoding may be performed by front end circuitry including fetch and decode units. Next control passes to block 1020, where this decoded instruction may be provided to an execution circuit.

Note that while this instruction indicates non-serialization and the execution is without a predetermined and heavyweight serialization arrangement, understand that some amount of serialization operations may occur. Thus at block 1030, a determination may be made as to an appropriate level of serialization. In embodiments, this determination may be based at least in part on the particular register to be written (here a target MSR) and its interaction with other instructions in flight within the machine (i.e., a state of the processor). In some instances, a micro-architecture of the processor may further be considered in this analysis.

While certain examples of different levels of serialization are described herein, understand that at a high level, processor hardware may ensure that an appropriate and minimal amount of serialization is performed for a given instruction, rather than a full and heavyweight serialization as with a conventional write MSR instruction. Stated another way, in response to a non-serialization write instruction as described herein, a minimal amount of serialization may be performed to maintain functional correctness, rather than executing an instruction according to architectural serialization.

Still with reference to FIG. 10, control next passes to block 1040 where the instruction can be executed according to the determined amount of serialization (which may range from none, to partial, to full serialization). As a result of this execution, a value of a source operand of the instruction may be written to the target MSR, namely the destination MSR specified by a destination operand of the instruction. While described as having source and destination operands, such as may be provided by way of explicit operands specified in an instruction, in some implementations understand that these operands may be implicit.

In any event, after the value is written to the appropriate MSR, control passes to block 1060 where the non-serializing MSR instruction may be retired. Note that while the above implementation is shown at a high level, variations and alternatives are possible. For example, while this specific non-serialization write instruction is defined for an MSR, embodiments are not limited in this regard, and it is possible for the non-serialization techniques described herein to be applied to instructions that write other states of a processor, including general-purpose registers as well as other hardware states.

Figure 11A:
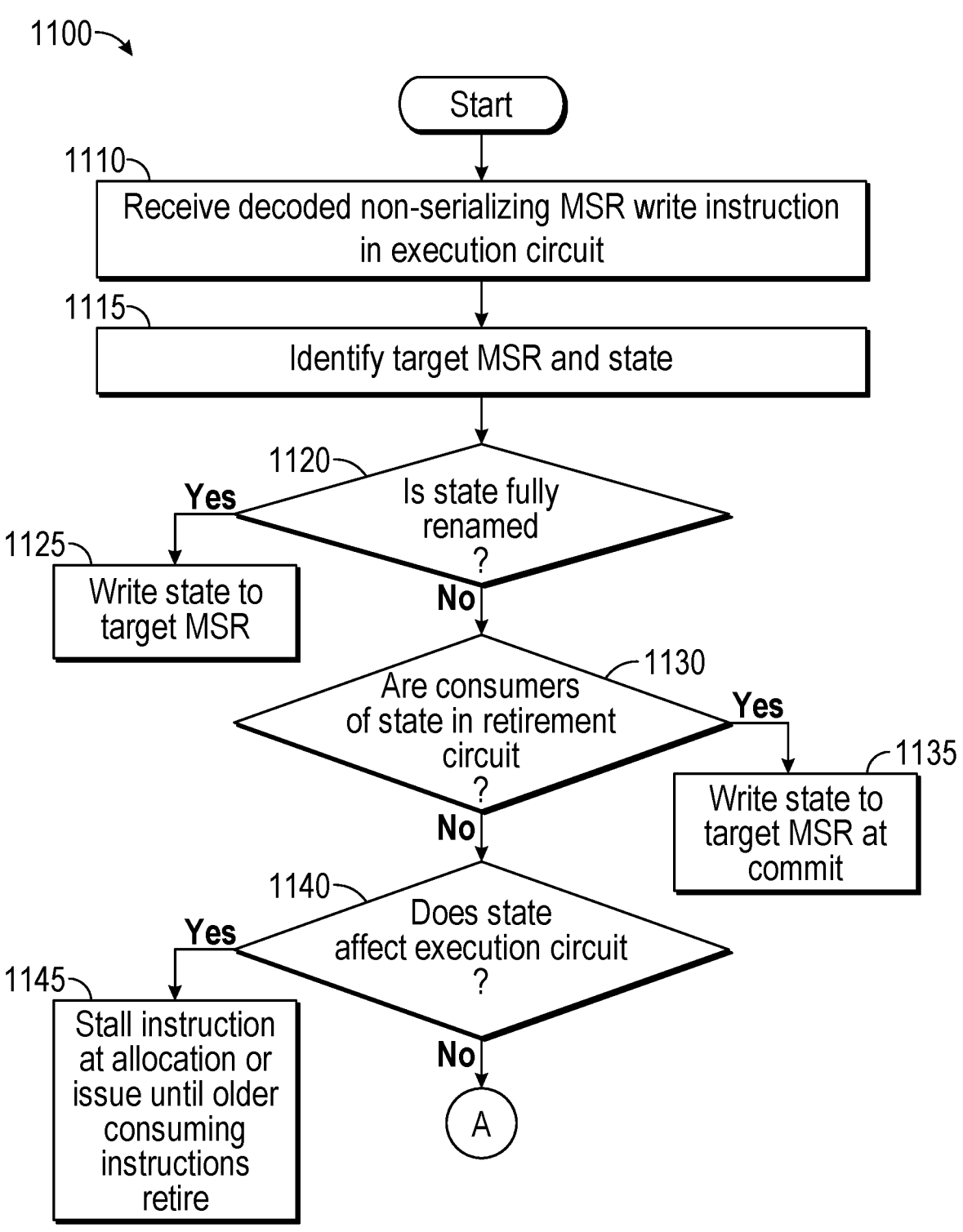
FIGS. 11A and 11B are a flow diagram of a method in accordance with another embodiment.
Figure 11B:
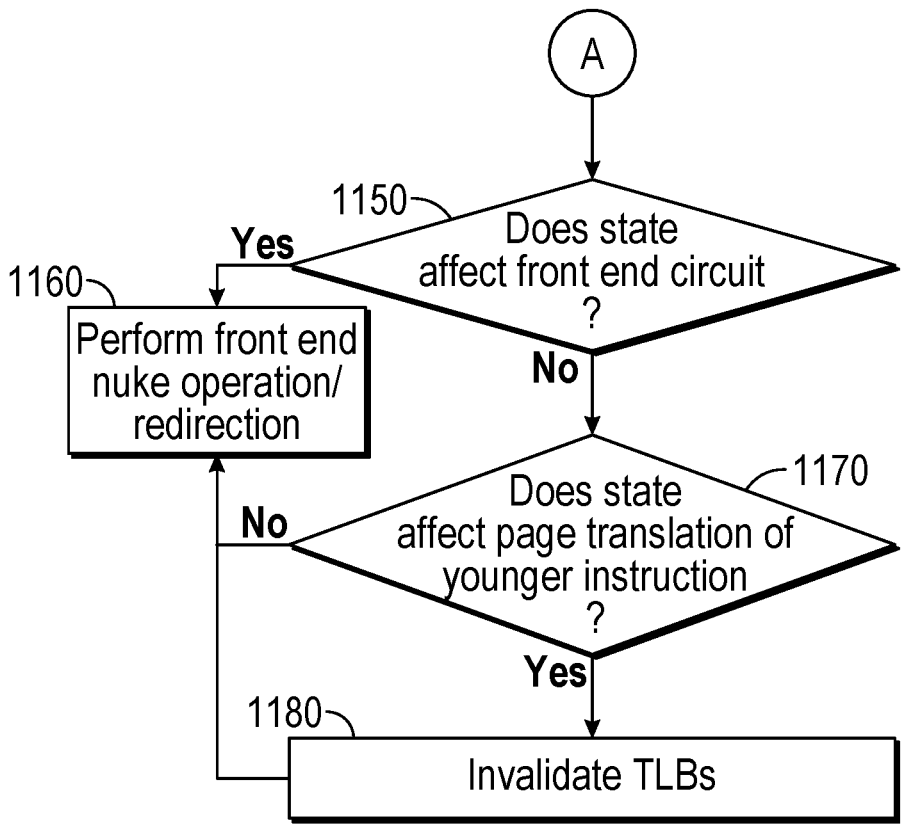

Referring now to FIGS. 11A and 11B, shown are a flow diagram of a method in accordance with another embodiment. More specifically, method 1100 is a particular method for executing a non-serializing MSR write instruction in accordance with an embodiment. In an embodiment, method 1100 may be performed, at least in part, by a PLA or other programmable hardware circuitry to controllably determine and apply a minimal amount of serialization to ensure functional correctness.

As illustrated, method 1100 begins by receiving a decoded non-serializing MSR write instruction in an execution circuit (block 1110). Next at block 1115 a target MSR and its state may be identified. As an example, the instruction may include implicit or explicit operands to identify the destination MSR to be written and a value to be written to the destination MSR. Furthermore, understand that at this point, processor hardware may determine the interaction of this state (here a given MSR) and its relevance to other processor state, namely instructions in the pipeline including instructions in flight that may access the same MSR.

Based on this analysis, control may proceed to diamond 1120 to determine whether the state is fully renamed. This determination may further take into account a micro-architecture. For example, where a processor has hardware to ensure perfect ordering between producers and consumers (e.g., a memory ordering buffer), the determination here may be in the affirmative. In this situation, as the state to be written is not subject to access by instructions already in flight, no serialization is needed. As such, control passes to block 1125 where the state may be written to the target MSR (without any serialization).

Still with reference to FIG. 11A, instead if the determination in diamond 1120 is in the negative, control passes to diamond 1130 to determine whether consumers of the state are present in a retirement circuit (i.e., after such consumer has already executed). If this is so, control passes to block 1135 where the state may be written to the target MSR at commit. Stated another way, this minimal serialization provides for execute at commit since a state update micro-operation at commit is the only needed serialization as there is no reason to delay allocation of any other younger operations.

Still with reference to FIG. 11A, if the determination at diamond 1130 is in the negative, control passes to diamond 1140 to determine whether the state affects one or more operations present in an execution circuit. If so, control passes to block 1145 where the instruction may be stalled at allocation or issue (i.e., in a front end circuit) until older consuming instructions retire. Thus at this point, there is increased serialization, as both older consuming instructions may be retired and older macro-jumps (if present) may be resolved prior to allowing a state update micro-operation to allocate. Note that this amount of serialization may be used where a state change only affects allocation or execution stages of a pipeline. Similarly, an issue stall may proceed the same but the instruction may be stalled from issuing from a front end circuit of the machine until all older operations are retired.

Control next passes to FIG. 11B. Here at diamond 1150 it may be determined whether the state affects a front end circuit. If so, a more heavyweight serialization operation may be performed. In the particular implementation of FIG. 11B, control may pass to block 1160 where a front end nuke operation and/or a redirection may occur. Thus, in this example, younger macro-instructions may be stopped from fetching, and an entire front end circuit of the processor may be flushed before allowing the state update to proceed. Such operation may occur where a state update of the non-serializing write instruction affects a front end circuit of the machine and/or decoding of younger macro-instructions.

Finally with continued reference to FIG. 11B, it may be determined at diamond 1170 whether the state affects a page translation of a younger instruction. If so, control passes to block 1180 where one or more TLBs may be invalidated, and then control may proceed for block 1160 for a front-end nuke.

Understand while shown with particular serialization levels and paths in this exemplary method, many other serialization operations and considerations may be present. More generally, method 1100 and the controllable serialization described herein enables hardware to identify a minimal and sufficient amount of serialization that is appropriate for the specific state being updated by a non-serializing write instruction.

Embodiments may be particularly suited for micro-architectures that have the ability to stall specific points in a pipeline to prevent speculative execution of instructions or micro-operations that read or write states that affect certain stages of a pipeline. Understand further that in method 1100 and more generally with the techniques herein, a controllable amount of serialization may proceed, desirably from a consideration of no or minimal serialization to more heavyweight serializations, depending upon the above-described factors of the state being updated, access to the state by instructions or other operations in flight, and micro-architectural capabilities.

The following examples pertain to further embodiments.

In one example, a processor includes: a plurality of registers; a front end circuit to fetch and decode a non-serializing register write instruction, the non-serializing register write instruction to cause a value to be stored in a first register of the plurality of registers; and an execution circuit coupled to the front end circuit, where the execution circuit, in response to the decoded non-serializing register write instruction, is to determine an amount of serialization for the non-serializing register write instruction and execute the decoded non-serializing register write instruction according to the amount of serialization.

In an example, the processor further comprises a programmable logic array to determine the amount of serialization based at least in part on an identification of the first register and a state of the processor.

In an example, the execution circuit, in response to the decoded non-serialization register write instruction, is to access the value from a second register and store the value in the first register, the first register comprising a destination location and the second register comprising a source location.

In an example, at least one of the source location and the destination location comprises an implicit operand of the non-serializing register write instruction.

In an example, the execution circuit is to write the value to the first register at commit in response to a determination that one or more consumers of the first register are in a retirement circuit of the processor.

In an example, the execution circuit is to write the value to the first register without serialization, in response to a determination that one or more in-flight instructions that access the first register are renamed.

In an example, the execution circuit is to stall the non-serializing register write instruction in response to a determination that one or more in-flight instructions that access the first register affect operation within the execution circuit.

In an example, the instruction comprises a non-serializing MSR write instruction of an instruction set architecture, and in response thereto, the execution circuit is to write the value to the first register comprising a first MSR.

In an example, the non-serializing MSR instruction comprises a first operand to identify the first MSR and a second operand to identify a location of the value, where the execution circuit is to obtain the value from the location and write the value to the first MSR.

In an example, the execution circuit is to determine the amount of serialization comprising a minimal amount of serialization to ensure functional correctness for the non-serializing register write instruction.

In another example, a method comprises: receiving and decoding a non-serializing MSR write instruction of an instruction set architecture; identifying a target MSR of the non-serializing MSR write instruction and state information associated with the target MSR; based at least in part on the target MSR and the state information, determining an amount of serialization to apply; and executing the non-serializing MSR write instruction with the amount of serialization.

In an example, the method further includes identifying the state information associated with the target MSR comprising an identification of one or more in-flight instructions that access the target MSR.

In an example, the method further includes identifying the state information associated with the target MSR further comprising an identification of a location in the processor of the one or more in-flight instructions that access the target MSR.

In an example, the method further includes writing a value of a source operand to the target MSR, the target MSR comprising a destination operand of the non-serializing MSR write instruction.

In an example, the method further includes writing the value to the target MSR at commit in response to a determination that one or more consumers of the first register are in a retirement circuit of the processor.

In an example, the method further includes writing the value to the target MSR without serialization, in response to a determination that one or more in-flight instructions that access the target MSR are renamed.

In an example, the method further includes determining the amount of serialization to apply further based on a micro-architecture of the processor.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a processor and a system memory coupled to the processor. The processor may include: a plurality of general-purpose registers; a plurality of MSRs; a front end circuit to fetch and decode a non-serializing MSR write instruction of an instruction set architecture, the non-serializing MSR write instruction to cause a value to be stored in a first MSR of the plurality of MSRs; and a programmable circuit to determine an amount of serialization for the non-serializing MSR write instruction based at least in part on a status of one or more in-flight instructions that access the first MSR; an execution circuit to execute instructions; and a retirement circuit to retire instructions, where one of the execution circuit and the retirement circuit is to execute the non-serializing MSR write instruction based on the amount of serialization; and a system memory coupled to the processor.

In an example, the execution circuit is to execute the non-serializing MSR write instruction without serialization if one or more consumer instructions of the first MSR have been renamed; and the retirement circuit is to execute the non-serializing MSR write instruction at commit if the one or more consumer instructions of the first MSR are located in the retirement circuit.

In an example, the execution circuit comprises the programmable circuit, the programmable circuit to determine the amount of serialization comprising a minimal amount of serialization to ensure functional correctness for the non-serializing MSR write instruction.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE-PROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A processor comprising:
a plurality of registers;
a front end circuit to fetch and decode a non-serializing register write instruction, wherein the non-serializing register write instruction is not defined architecturally as a serializing instruction, wherein the non-serializing register write instruction does not by default cause the processor to drain all buffered writes to a memory before a next instruction is fetched, and wherein a register write instruction that is defined architecturally as a serializing instruction, for a majority of the plurality of registers, drains all buffered writes to the memory before the next instruction is fetched, the non-serializing register write instruction to cause a value to be stored in a first register of the plurality of registers; and
an execution circuit coupled to the front end circuit, wherein the execution circuit, in response to the decoded non-serializing register write instruction, is to execute the decoded non-serializing register write instruction to store the value in the first register of the plurality of registers, and ensure that operations before the non-serializing register write instruction do not use the value, and that operations after the non-serializing register write instruction use the value.

2. The processor of claim 1, further comprising a programmable logic array to determine an amount of serialization for the non-serializing register write instruction based at least in part on an identification of the first register and a state of the processor.

3. The processor of claim 1, wherein the execution circuit, in response to the decoded non-serializing register write instruction, is to access the value from a second register and store the value in the first register, the first register comprising a destination location and the second register comprising a source location.

4. The processor of claim 3, wherein at least one of the source location and the destination location comprises an implicit operand of the non-serializing register write instruction.

5. The processor of claim 3, wherein the execution circuit is to write the value to the first register at commit in response to a determination that one or more consumers of the first register are in a retirement circuit of the processor.

6. The processor of claim 3, wherein the execution circuit is to write the value to the first register without serialization, in response to a determination that one or more in-flight instructions that access the first register are renamed.

7. The processor of claim 3, wherein the execution circuit is to stall the non-serializing register write instruction in response to a determination that one or more in-flight instructions that access the first register affect operation within the execution circuit.

8. The processor of claim 1, wherein the non-serializing register write instruction comprises a non-serializing model specific register (MSR) write instruction of an instruction set architecture, and in response thereto, the execution circuit is to write the value to the first register comprising a first MSR.

9. The processor of claim 8, wherein the non-serializing register write instruction comprises a first operand to identify the first MSR and a second operand to identify a location of the value, wherein the execution circuit is to obtain the value from the location and write the value to the first MSR and at least one of the first or second operands comprises an implicit operand.

10. The processor of claim 1, wherein the execution circuit is to determine an amount of serialization comprising a minimal amount of serialization to ensure functional correctness for the non-serializing register write instruction.

11. At least one non-transitory machine-readable storage medium comprising instructions that, when executed, cause a processor to:
receive and decode a non-serializing model specific register (MSR) write instruction of an instruction set architecture, wherein the non-serializing MSR write instruction is not defined architecturally as a serializing instruction, wherein the non-serializing register write instruction does not by default cause the processor to drain all buffered writes to a memory before a next instruction is fetched and executed, and wherein an MSR write instruction that is defined architecturally as a serializing instruction, for a majority of a plurality of MSRs of the processor, drains all buffered writes to the memory before the next instruction is fetched and executed;
identify a target MSR of the non-serializing MSR write instruction and state information associated with the target MSR;
based at least in part on the target MSR and the state information, determine an amount of serialization to apply; and
execute the non-serializing MSR write instruction with the amount of serialization.

12. The at least one non-transitory machine-readable storage medium of claim 11, further comprising instructions that, when executed, cause the processor to identify the state information associated with the target MSR comprising an identification of one or more in-flight instructions that access the target MSR.

13. The at least one non-transitory machine-readable storage medium of claim 12, further comprising instructions that, when executed, cause the processor to identify the state information associated with the target MSR further comprising an identification of a location in the processor of the one or more in-flight instructions that access the target MSR.

14. The at least one non-transitory machine-readable storage medium of claim 11, further comprising instructions that, when executed, cause the processor to write a value of a source operand to the target MSR, the target MSR comprising a destination operand of the non-serializing MSR write instruction, wherein at least one of the source operand or the destination operand comprises an implicit operand.

15. The at least one non-transitory machine-readable storage medium of claim 14, further comprising instructions that, when executed, cause the processor to write the value to the target MSR at commit in response to a determination that one or more consumers of the target MSR are in a retirement circuit of the processor.

16. The at least one non-transitory machine-readable storage medium of claim 14, further comprising instructions that, when executed, cause the processor to write the value to the target MSR without serialization, in response to a determination that one or more in-flight instructions that access the target MSR are renamed.

17. The at least one non-transitory machine-readable storage medium of claim 11, further comprising instructions that, when executed, cause the processor to determine the amount of serialization to apply further based on a micro-architecture of the processor.

18. A system comprising:
a processor comprising:
    a plurality of general-purpose registers;
    a plurality of model specific registers (MSRs);
    a front end circuit to fetch and decode a non-serializing MSR write instruction of an instruction set architecture, wherein the non-serializing MSR write instruction is not defined architecturally as a serializing instruction, wherein the non-serializing MSR write instruction does not by default cause the processor to drain all buffered writes to a memory before a next instruction is fetched, and wherein an MSR write instruction that is defined architecturally as a serializing instruction, for a majority of the MSRs, drains all buffered writes to the memory before the next instruction is fetch, the non-serializing MSR write instruction to cause a value to be stored in a first MSR of the plurality of MSRs;
    a circuit to ensure that one or more in-flight instructions that access the first MSR do not use the value to be stored in the first MSR;
    an execution circuit to execute instructions; and
    a retirement circuit to retire instructions, wherein one of the execution circuit and the retirement circuit is to execute the non-serializing MSR write instruction to store the value in the first MSR after the one or more in-flight instructions have accessed the first MSR; and
a system memory coupled to the processor.

19. The system of claim 18, wherein:
the execution circuit is to execute the non-serializing MSR write instruction without serialization if one or more consumer instructions of the first MSR have been renamed; and
the retirement circuit is to execute the non-serializing MSR write instruction at commit if the one or more consumer instructions of the first MSR are located in the retirement circuit.

20. The system of claim 18, wherein the execution circuit comprises the circuit, the circuit is to determine an amount of serialization comprising a minimal amount of serialization to ensure functional correctness for the non-serializing MSR write instruction.

* * * * *